United States Patent
Dudar

(10) Patent No.: US 10,590,879 B2
(45) Date of Patent: Mar. 17, 2020

(54) VARIABLE DISPLACEMENT ENGINE DIAGNOSTIC METHOD

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 15/844,240

(22) Filed: Dec. 15, 2017

(65) Prior Publication Data

US 2019/0186401 A1   Jun. 20, 2019

(51) Int. Cl.
| | | |
|---|---|---|
| F02D 41/22 | (2006.01) | |
| F02D 13/06 | (2006.01) | |
| F02D 41/00 | (2006.01) | |
| G07C 5/08 | (2006.01) | |
| F01L 1/047 | (2006.01) | |
| F01L 13/00 | (2006.01) | |

(52) U.S. Cl.
CPC .......... *F02D 41/221* (2013.01); *F02D 13/06* (2013.01); *F02D 41/0087* (2013.01); *G07C 5/0816* (2013.01); *F01L 1/047* (2013.01); *F01L 2013/001* (2013.01); *F02D 2041/0012* (2013.01); *F02D 2041/227* (2013.01); *F02D 2200/0625* (2013.01); *F02D 2200/501* (2013.01)

(58) Field of Classification Search
CPC .... F02D 41/221; F02D 41/0087; F02D 13/06; F02D 2021/227; F02D 2021/0012; F02D 2200/0625; F02D 2200/501; G07C 5/0816; G07C 5/0808; F01L 1/047; F01L 3/0005; F01L 2013/001; F01L 13/00
See application file for complete search history.

(56) References Cited

U.S. PATENT DOCUMENTS

| | | | | |
|---|---|---|---|---|
| 5,721,375 | A * | 2/1998 | Bidner | F01L 13/0005 701/101 |
| 7,921,709 | B2 * | 4/2011 | Doering | F02D 13/06 73/114.37 |
| 8,286,471 | B2 * | 10/2012 | Doering | F01L 13/00 73/114.79 |
| 9,275,010 | B2 | 3/2016 | Kote et al. | |
| 2003/0217728 | A1 * | 11/2003 | Hasebe | B60K 6/485 123/198 F |

(Continued)

FOREIGN PATENT DOCUMENTS

EP     2610127 A2     7/2013

OTHER PUBLICATIONS

Dudar, A., "Systems and Methods for a Variable Displacement Engine," U.S. Appl. No. 15/468,013, filed Mar. 23, 2017, 74 pages.

(Continued)

*Primary Examiner* — George C Jin
(74) *Attorney, Agent, or Firm* — Geoffrey Brumbaugh McCoy Russell LLP

(57) ABSTRACT

Methods and systems are provided for diagnosing a variable displacement engine. In one example, a method includes during steady-state vehicle cruising, operating an engine with one or more cylinders of the engine deactivated, commanding the one or more cylinders to reactivate, and indicating cylinder valve actuator degradation responsive to a fuel usage change following the command to reactivate.

18 Claims, 7 Drawing Sheets

(56) References Cited

U.S. PATENT DOCUMENTS

| | | | |
|---|---|---|---|
| 2006/0243040 A1* | 11/2006 | Reed | F01L 9/04 |
| | | | 73/114.79 |
| 2010/0031738 A1* | 2/2010 | Feldkamp | G01M 15/042 |
| | | | 43/114.79 |
| 2014/0277971 A1 | 9/2014 | Oshiro et al. | |
| 2016/0297435 A1 | 10/2016 | D'Amato et al. | |

OTHER PUBLICATIONS

Dudar, A., "System and Method for Diagnosing a Variable Displacement Engine," U.S. Appl. No. 15/608,806, filed May 30, 2017, 40 pages.

* cited by examiner

VARIABLE DISPLACEMENT ENGINE DIAGNOSTIC METHOD

FIELD

The present description relates generally to a variable displacement engine and more particularly to a method for diagnosing a variable displacement engine mechanism.

BACKGROUND/SUMMARY

Multi-cylinder engines known as variable displacement engines (VDEs) may operate with a variable number of active or deactivated cylinders to obtain fuel savings. Therein, a portion of the engine's cylinders may be disabled during selected conditions such as low engine speed and engine load. For example, a VDE may operate on all cylinders when a heavy load is being demanded, such as during an acceleration event. However, during a light load or a low speed condition, when demanded engine torque is low, some of the engine's cylinders may be disabled, increasing engine efficiency and minimizing pumping losses. Some VDEs may disable a selected group of cylinders, for example, a bank of cylinders, via a plurality of cylinder valve deactivators that affect the operation of the cylinder's intake and exhaust valves, via selectively withholding spark to deactivatable cylinders, and/or via disabling the fuel injectors of the disabled cylinders, thereby improving the fuel economy of the vehicle. On the other hand, the engine may operate with all cylinders active (combusting air and fuel) during high driver demand/engine torque conditions. In this way, the engine may enter and exit cylinder deactivation modes to accommodate different driving conditions.

Over time and varying vehicle operating conditions, the mechanisms that actuate the deactivatable cylinder valves (e.g., VDE mechanisms) may degrade, leaving the intake and/or may be impacted as the inability to seal the cylinder during deactivation results in pumping losses. Therefore, it may be desirable to determine whether or not VDE mechanisms controlling engine cylinders are operating as desired.

Various approaches have been identified for diagnosing degradation in a VDE system, such as based on manifold pressure. One example approach for diagnosing a VDE mechanism operation is shown by Bidner et al. in U.S. Pat. No. 5,721,375. Therein, detection of degradation of valve deactivation mechanisms is based on a pressure difference between an expected and an actual cylinder air charge manifold pressure during VDE operation relative to the pressure difference during non-VDE operation. Additional approaches for diagnosing VDE mechanism degradation and/or leaky cylinder exhaust valves may include the use of in-cylinder pressure sensors.

However, the inventors herein have recognized potential issues with such systems. As one example, in an engine with a large number of cylinders (e.g., six, eight, etc.), changes in engine airflow and/or manifold pressure reflective of a single cylinder valve degradation may not be identifiable. For example, in the event of an intake valve degradation occurring in just one cylinder of the engine, manifold pressure may not be impacted sufficiently to differentiate the change in manifold pressure resulting from the degraded intake valve from other fluctuations in manifold pressure. Further, fluctuations in engine airflow and/or manifold pressure not related to VDE degradation may confound the detection of VDE mechanism degradation during some conditions. Further still, the use of in-cylinder pressure sensors may be costly.

Thus, in one example, the issues described above may be at least partly addressed by a method including, during steady-state vehicle cruising, operating an engine with one or more cylinders of the engine deactivated, commanding the one or more cylinders to reactivate, and indicating cylinder valve actuator degradation responsive to a fuel usage change following the command to reactivate. In this way, a reliable diagnosis of VDE functioning may be made and degradation of the VDE mechanism controlling one or more cylinders may be determined.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
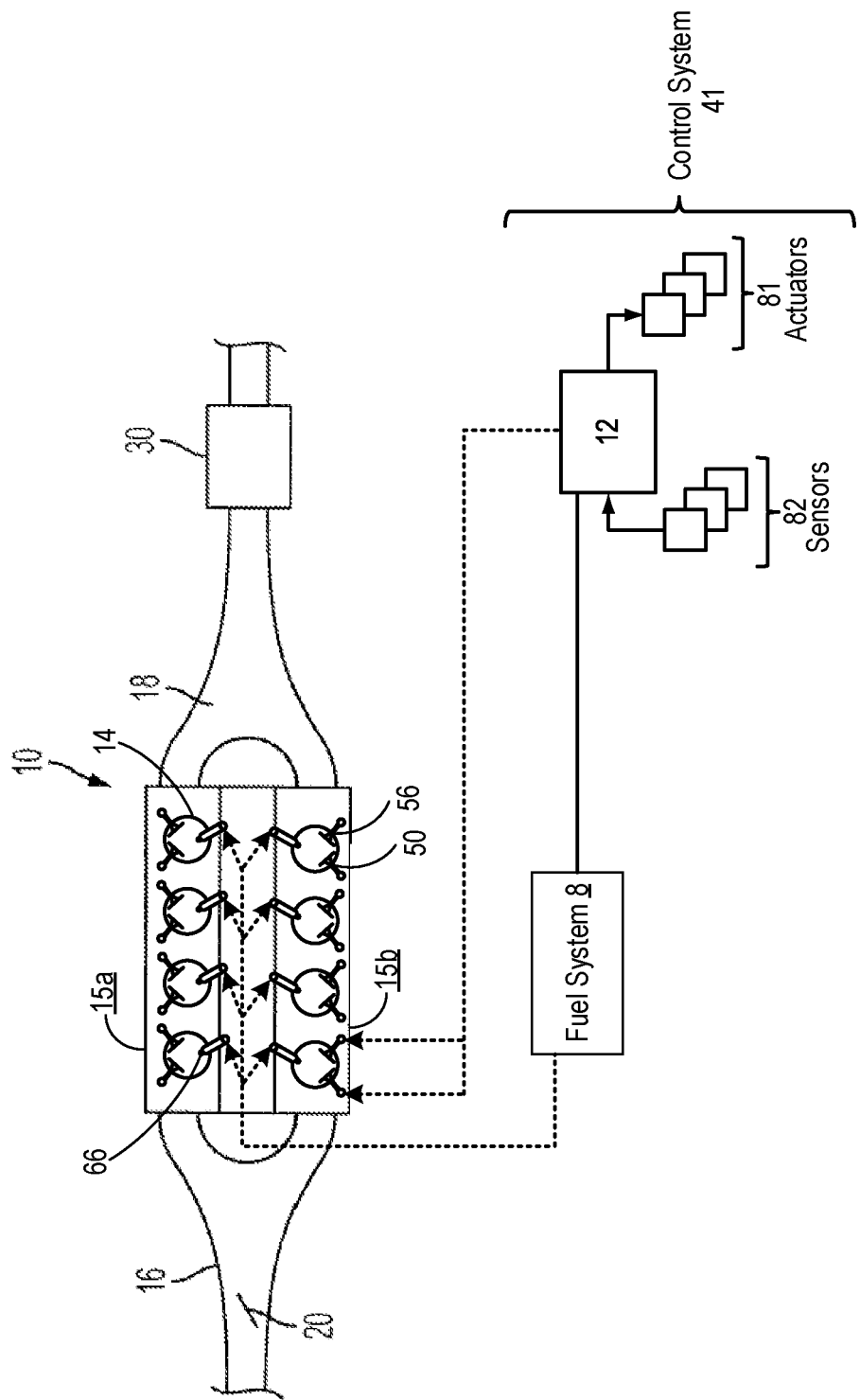
FIG. 1 shows an embodiment of an engine configured with individual cylinder deactivation mechanisms.

The following description relates to a method for diagnosing variable displacement engine mechanisms of an engine, such as the engine shown in FIG. 1, configured to operate with a variable number of cylinders (referred to as variable displacement). The multi-cylinder engine system of FIG. 1 may selectively deactivate one or more cylinders based on engine operating conditions, wherein one or more cylinders may be configured with individual cylinder valve activation and deactivation mechanisms shown in FIG. 2, such that engine displacement may be varied in a manner optimal for efficient engine operation. As such, the variable displacement engine, such as the engine depicted in FIGS. 1-2, may operate with all cylinders firing in one example, or half the total number of cylinders firing in another example, or some select cylinders firing in yet another example. The activation and deactivation of the VDE may be carried out by changing the operation of the intake and exhaust valves of the selected cylinders (e.g., holding the intake and exhaust valves closed over multiple cylinder cycles), however, various other cylinder valve deactivation approaches may also be used such as deactivating fuel injectors and/or spark.

Figure 3:
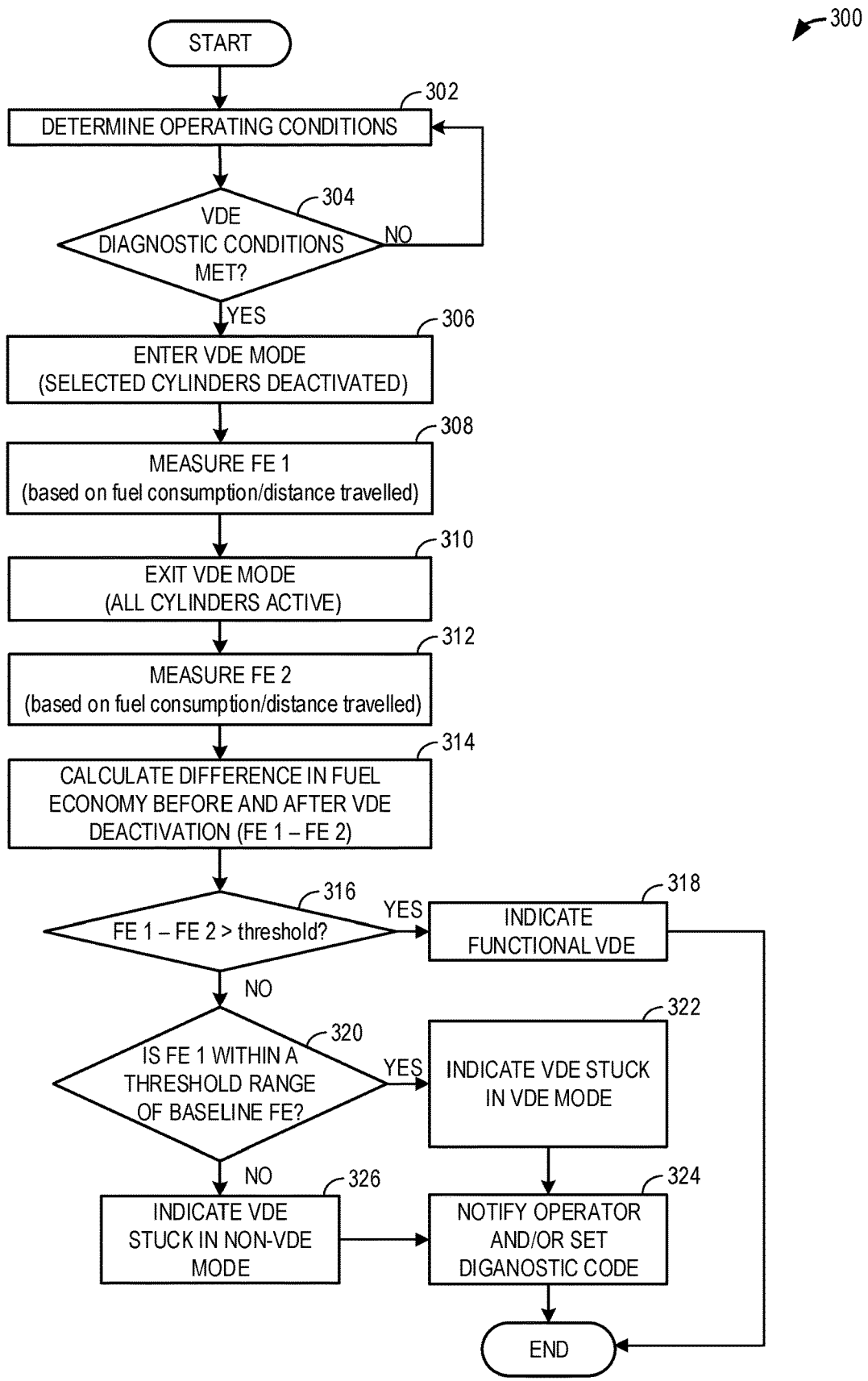
FIG. 3 shows a flow chart illustrating a method for diagnosing degraded VDE mechanisms based on fuel economy.
Figure 4:
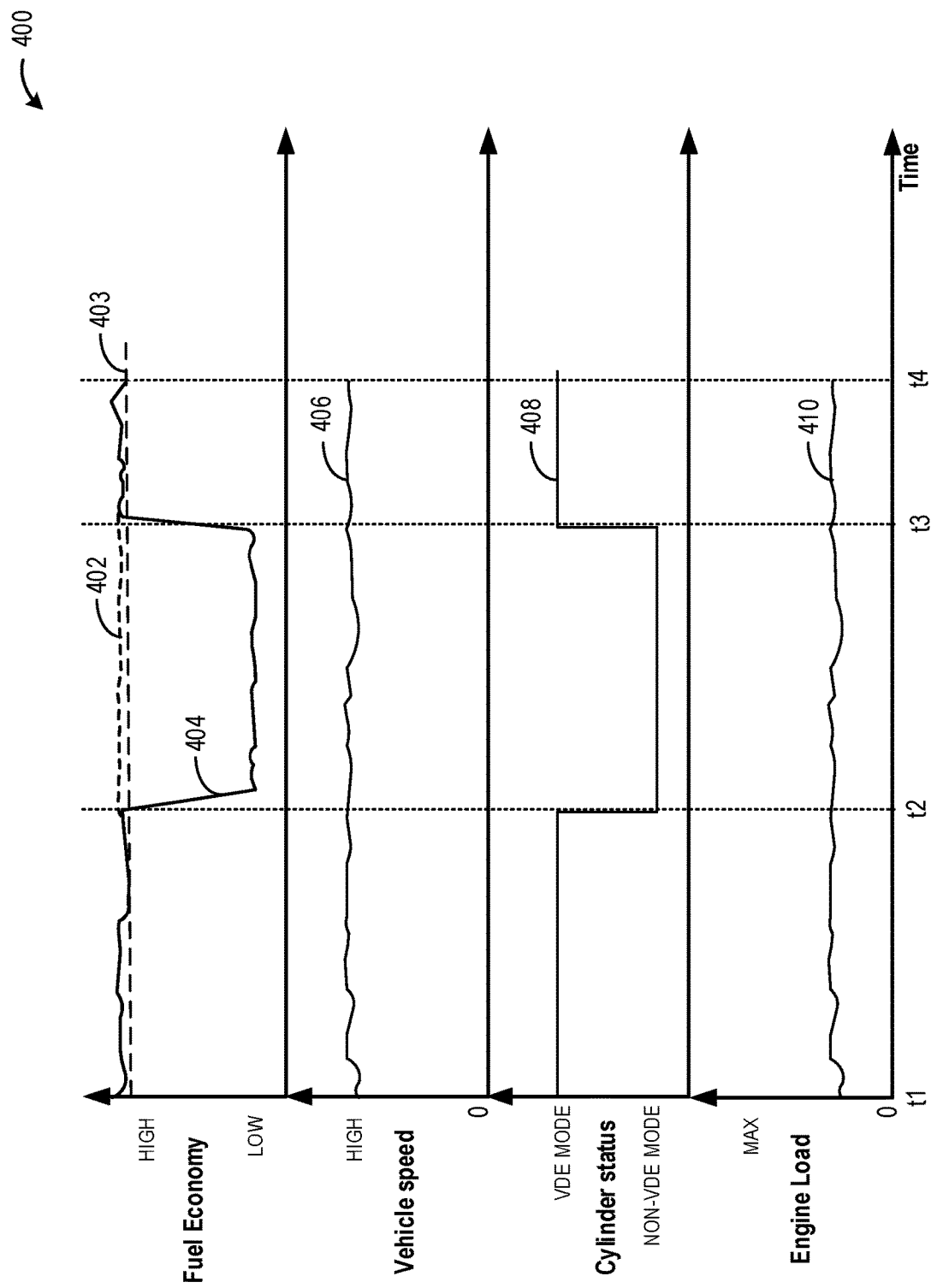
FIG. 4 shows a first example map of engine operating parameters during a diagnosis of VDE mechanisms.
Figure 5:
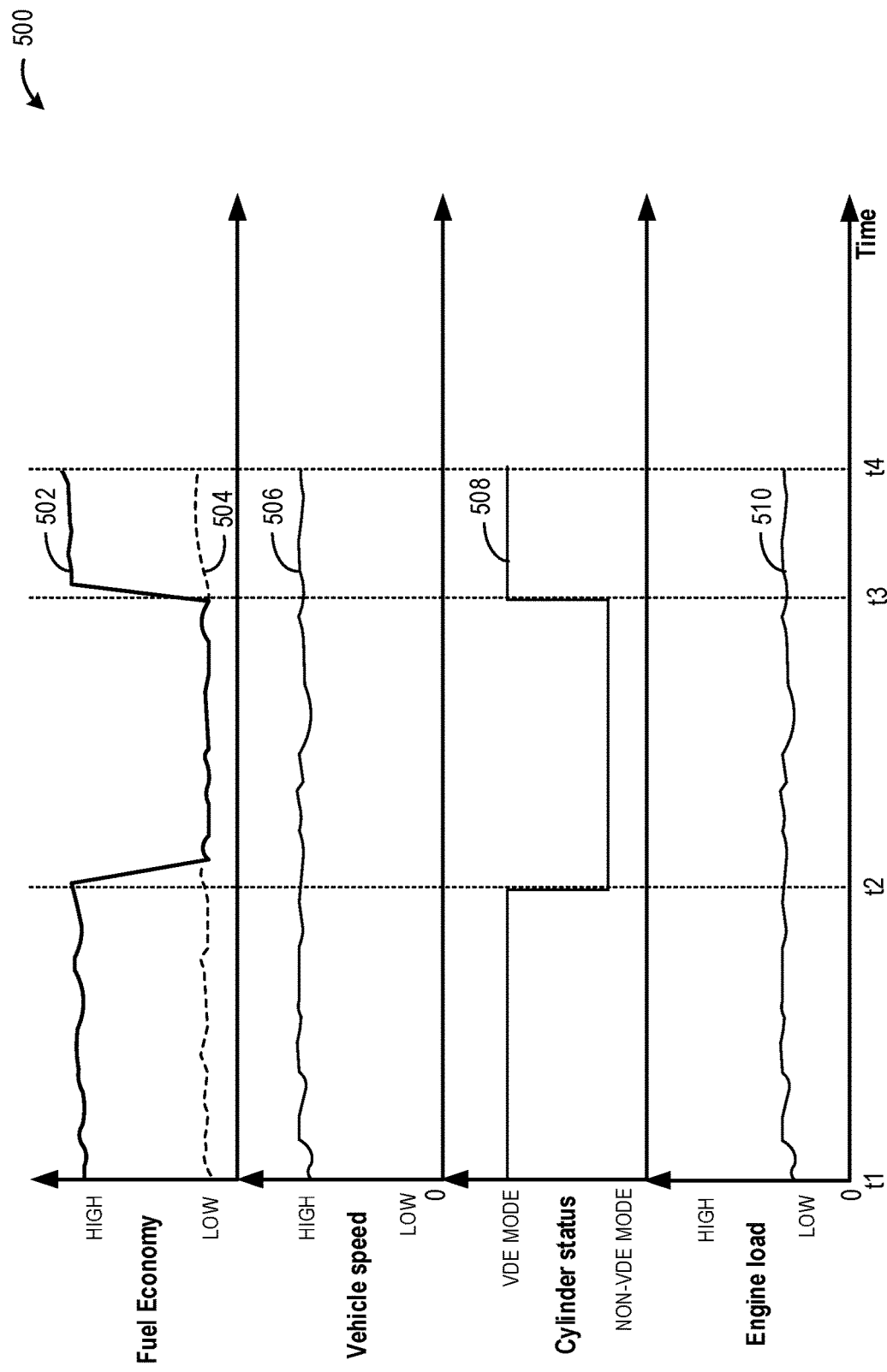
FIG. 5 shows a second example map of engine operating parameters during a diagnosis of VDE mechanisms.
Figure 6:
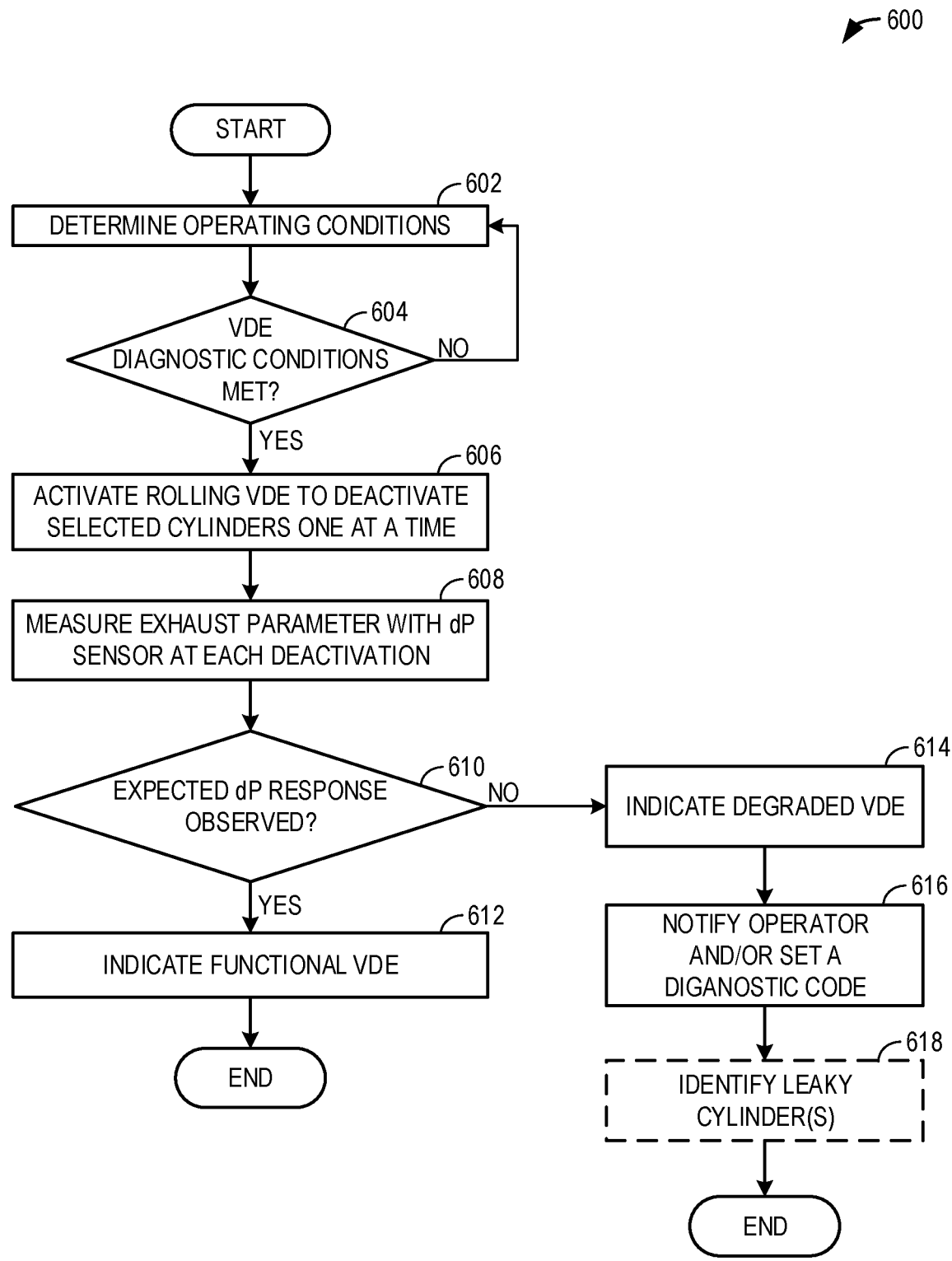
FIG. 6 shows a flow chart illustrating a method for diagnosing degraded VDE mechanisms based on exhaust flow.
Figure 7:
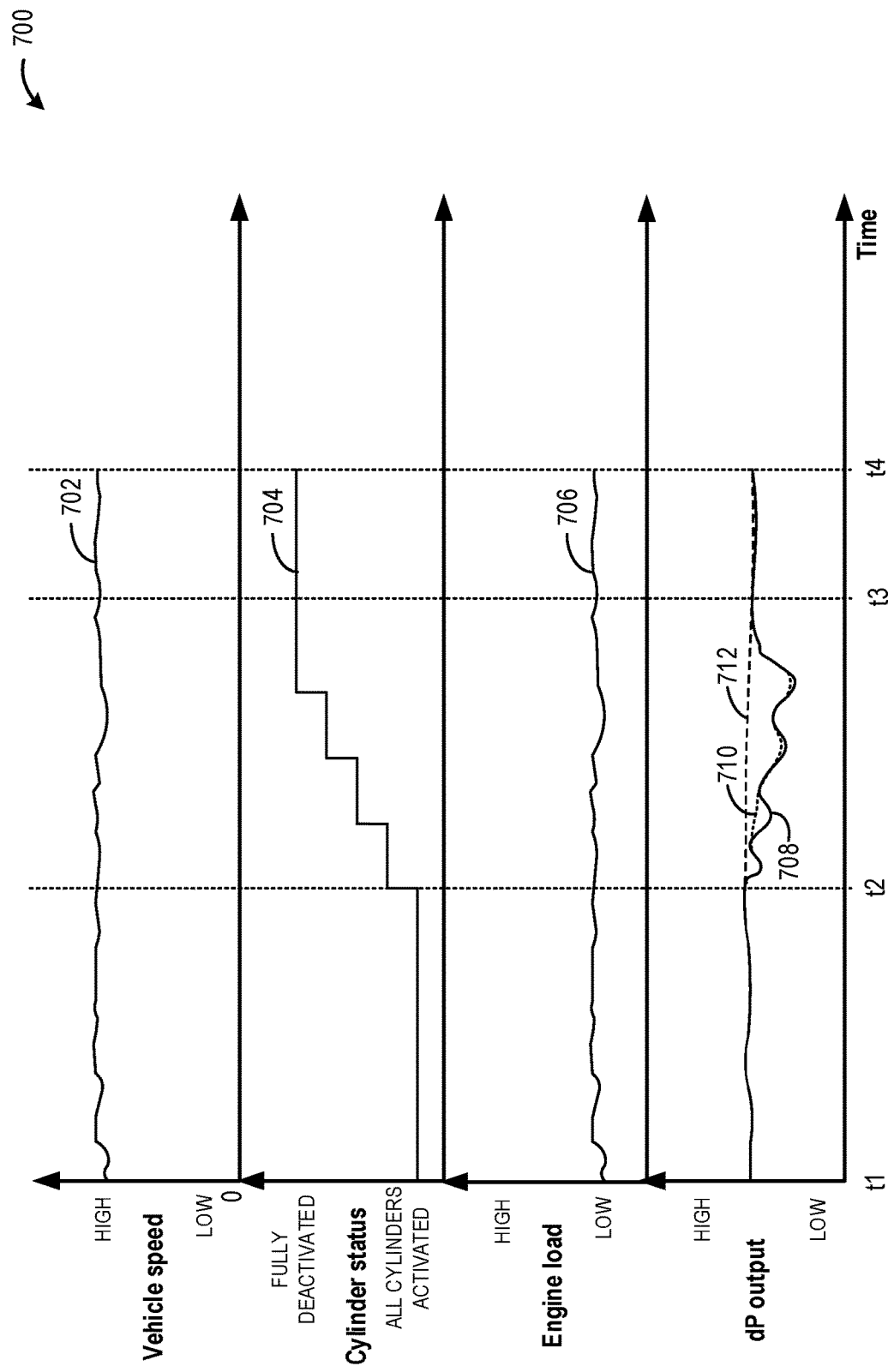
FIG. 7 shows a third example map of engine operating parameters during a diagnosis of VDE mechanisms.

An engine controller may direct a VDE system diagnostic routine during steady-state vehicle speeds, wherein the engine controller may selectively activate and deactivate VDE operation and the resulting fuel economy metrics may be used to identify degradation of the VDE mechanism, as shown with reference to the example operation illustrated in FIG. 3. The controller may also coordinate the VDE system diagnostic routine during a rolling VDE operation, utilizing exhaust pressure or flow to confirm degradation of the VDE mechanism as shown with reference to the example operation of FIG. 6. Example engine operation diagrams showing engine operating parameters during execution of the methods of FIGS. 3 and 6 are shown in FIGS. 4, 5, and 7.

In a first example, the engine may be commanded to operate in a VDE mode during steady-state operation with light engine load (e.g., during highway cruising). When the engine operates in the VDE mode, the number of active cylinders may be reduced. A controller of the vehicle may calculate a resulting first fuel economy during the VDE mode. If the VDE mechanisms are not degraded, the first fuel economy calculated during the VDE mode (e.g., with less than the total number of cylinders firing) may be similar to or equal to a baseline fuel economy. The baseline fuel economy may be determined when the VDE mechanism is intact and functional, such as following manufacture of the vehicle. Then, during steady-state operation comprising one or more of vehicle speed and engine load changing by less than a respective threshold amount, the VDE mode may be disabled and the engine may resume operating with all cylinders. A second fuel economy may be calculated while operating in the non-VDE mode. The switch in VDE operation may result in an expected change (e.g., a decrease) in the second fuel economy of the vehicle from both the baseline fuel economy and the first fuel economy calculated, if the VDE mechanism is not degraded. However, if the calculated second fuel economy remains unchanged (e.g., does not decrease), despite the commanded change in VDE, the VDE mechanism may be determined as degraded. Further, if the determined first fuel economy is found to be within a threshold of the baseline fuel economy, the VDE may be confirmed as stuck in the VDE mode, otherwise the VDE may be confirmed as being stuck in the non-VDE mode.

FIG. 1 shows an example engine 10 having a first bank 15a and a second bank 15b. In the depicted example, engine 10 is a V8 engine with the first and second banks each having four cylinders. In another example, engine 10 may include six cylinders the first and second banks each having three cylinders. Engine 10 has an intake manifold 16, throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine 10 may have cylinders 14 with selectively deactivatable intake valves 50 and selectively deactivatable exhaust valves 56. In one example, intake valves 50 and exhaust valves 56 are configured for camshaft actuation (as elaborated in FIG. 2) via individual camshaft-based cylinder valve actuators. Each engine cylinder bank may include one camshaft that actuates the intake and exhaust valves. In an alternate example, each engine cylinder bank may include one camshaft actuating intake valves and a separate camshaft actuating exhaust valves. In alternate examples, the valves may be configured for electric valve actuation (EVA) via electric individual cylinder valve actuators. While the depicted example shows each cylinder having a single intake valve and a single exhaust valve, in alternate examples, each cylinder may have a plurality of selectively deactivatable intake valves and/or a plurality of selectively deactivatable exhaust valves. The engine components actuated during cylinder valve activation/deactivation may collectively be referred to as VDE mechanisms.

During selected conditions, such as when the full torque capability of the engine is not desired (such as when engine load is less than a threshold load, or when operator torque demand is less than a threshold demand), one or more cylinders of engine 10 may be selected for selective deactivation (herein also referred to as variable displacement). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Herein, these may collectively be referred to as VDE mechanisms. Cylinder valves may be selectively deactivated via hydraulically actuated lifters (e.g., lifters coupled to valve pushrods), via a deactivating follower mechanism in which the cam lift following portion of the follower can be decoupled from the valve actuating portion of the follower, or via electrically actuated cylinder valve mechanisms coupled to each cylinder. In some examples, fuel flow to the deactivated cylinders may be stopped, such as by deactivating cylinder fuel injectors 66. In some examples, spark supplied to the deactivated cylinders may also be stopped.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from the enabled cylinders) exposed to combustion reduces engine heat losses, improving the thermal efficiency of the engine.

Engine 10 may operate on a plurality of substances, which may be delivered via fuel system 8. Fuel tanks in fuel system 8 may hold fuel with different fuel qualities, such as different fuel compositions. These differences may include different alcohol content, different octane, different heat of vaporizations, different fuel blends, and/or combinations thereof etc. Engine 10 may be controlled at least partially by a control system 41 including controller 12. Controller 12 may receive various signals from sensors 82 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors.

Figure 2:
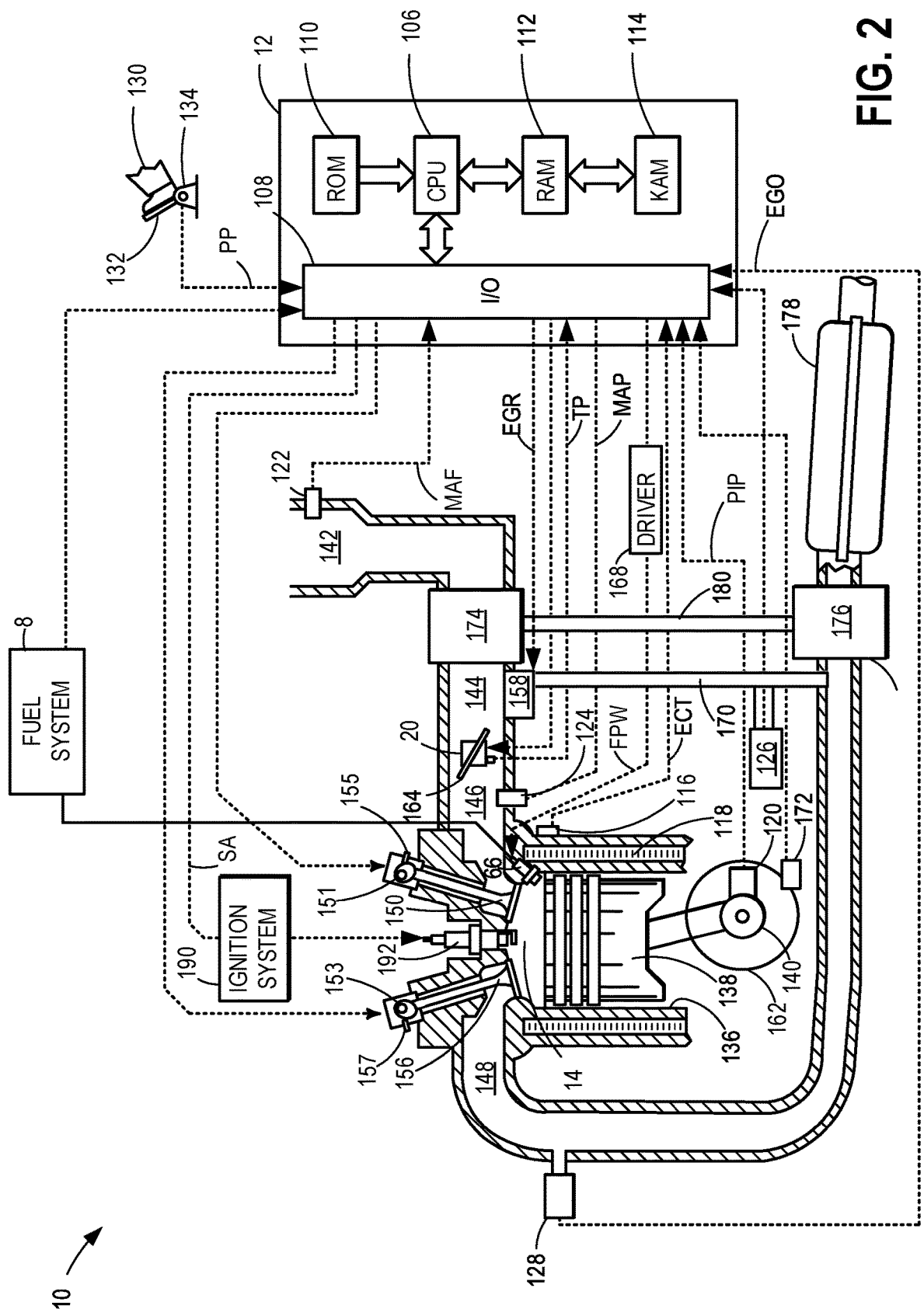
FIG. 2 shows a partial engine view.

FIG. 2 depicts an example embodiment of a combustion chamber or cylinder of internal combustion engine 10, such as engine 10 of FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to a flywheel 162 and at least one drive wheel of the passenger vehicle via a transmission system. Further, a starter motor 172 may be coupled to crankshaft 140 via flywheel 162 to enable cranking (e.g., spinning) of engine 10, typically used for starting the engine. When starting an engine, after combustion occurs, actuation of the starter is ceased as combustion facilitates spinning of the engine. In one example, starter motor 172 may be a conventional starter motor. In other examples, starter motor 172 may be an integrated starter motor, such as those typically found on hybrid vehicles.

Cylinder 14 may receive intake air via a series of air intake passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a boosting device configured as a turbocharger. Turbocharger includes a compressor 174 arranged between intake passages 142 and 144, and an exhaust turbine 176 arranged along exhaust passage 148. Compressor 174 may be at least partially powered by exhaust turbine 176 via a shaft 180. A charge air cooler (not shown) may be optionally included downstream of compressor 174. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Exhaust passage 148 and intake passage 144 may be fluidically coupled via an EGR tube 170 (e.g., EGR passage) that serves to recirculate exhaust gas from the exhaust passage to the intake passage. Flow through the EGR tube 170 is controlled by an EGR valve 158, which regulates the quantity of recirculated exhaust gas. The EGR valve 158 may be a continuously variable valve wherein a position of the valve is continuously variable from a fully closed position to a fully open position. An EGR pressure sensor 126 may be coupled to the EGR system in order to determine the exhaust gas flow rate. Specifically, EGR pressure sensor 126 may be a differential pressure sensor that measures the change in exhaust flow pressure before and after a restriction (e.g., orifice) in the EGR tube 170 that leads up to the EGR valve 158. In one example, the EGR pressure sensor 126 may be a Delta Pressure Feedback Exhaust (DPFE) sensor. In other examples, other suitable sensor configurations may be used. EGR pressure sensor 126 may send time-based EGR signals to the controller during nominal engine operation. Nominal engine operation is considered an ignition-on condition when the engine is operated in response to operator torque demands.

The controller may selectively actuate a vacuum solenoid (not shown) to actuate the EGR valve 158. The controller may actively control the EGR valve via the vacuum solenoid based on various engine signals. In one example, the controller may receive an indication of engine coolant temperature (ECT) from temperature sensor 116 coupled to cooling sleeve 118, a throttle position (TP) from a throttle position sensor, an exhaust gas flow measurement from EGR pressure sensor 126, or an absolute manifold pressure signal (MAP) from sensor 124 to regulate the vacuum solenoid. As an example, during a cold start condition, the controller may receive a signal indicating that the engine coolant temperature is below a threshold, and will thereby activate the vacuum solenoid to block vacuum to the EGR valve, keeping the EGR valve closed and preventing exhaust gas from recirculating from the exhaust passage 148 to the intake passage 144. In another example, under vehicle acceleration, motion of the throttle plate 164 may open a vacuum port that will actuate the EGR valve 158 to open. In further examples, other control methods for EGR valve actuation may be used.

Each cylinder of engine 10 may include one or more intake valves and one or more exhaust valves. For example, cylinder 14 is shown including at least one poppet-style intake valve 150 and at least one poppet-style exhaust valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 66. Fuel injector 66 is shown coupled directly to cylinder 14 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 14. While FIG. 2 shows fuel injector 66 as a side injector, it may also be located overhead of the piston, such as near the position of spark plug 192. Such a position may facilitate mixing and combustion when operating the engine with an alcohol-based fuel due to the lower volatility of some alcohol-based fuels. Alternatively, the injector may be located overhead and near the intake valve to facilitate mixing. Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, fuel injector 66 may be a port injector providing fuel into the intake port upstream of cylinder 14.

It will also be appreciated that while the depicted embodiment illustrates the engine being operated by injecting fuel via a single direct injector, in alternate embodiments, the engine may be operated by using two injectors (for example, a direct injector and a port injector) and varying a relative amount of injection from each injector. As described above, FIG. 2 shows one cylinder of a multi-cylinder engine. As such each cylinder may similarly include its own set of intake/exhaust valves, fuel injector(s), spark plug, etc.

Further, the distribution and/or relative amount of fuel delivered from the injector may vary with operating conditions. In one example, some vehicles may be operated in a deceleration fuel shut-off mode. Specifically, in response to the vehicle operating conditions including a running vehicle coasting (e.g., coasting downhill) with the transmission in gear, the controller may stop fuel delivery to cylinders of the engine (e.g., enter deceleration fuel shut-off (DFSO) mode) to increase fuel economy until an operator torque demand is received or engine operating conditions change such that fuel delivery is resumed. Signals indicating engine speed, pedal position, and throttle position may be used to determine when the controller initiates entering DFSO mode. DFSO mode may be differentiated from VDE mode in that all the cylinders stop receiving fuel during DFSO, and the intake and exhaust valves may continue to actuate during DFSO. Further, during DFSO, the vehicle may be propelled via inertia and not via engine torque.

For a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as exhaust gas (EGO) sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

Controller 12 is shown as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, exhaust gas flow from EGR pressure sensor 126, and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1-2 and employs the various actuators of FIGS. 1-2 to adjust engine operation based on the received signals and instructions stored on a memory of the controller. For example, adjusting the displacement of the engine may include adjusting an actuator coupled to a plurality of cylinder valves and/or control of fuel injectors coupled to deactivatable cylinders. In one example, the controller 12 may selectively deactivate a cylinder by adjusting an actuator to close its intake and exhaust valves and/or may selectively control the fuel injectors to cease fuel delivery to that cylinder.

Non-transitory storage medium read-only memory chip 110 can be programmed with computer readable data representing instructions executable by microprocessor unit 106 for performing the methods described below as well as other variants that are anticipated but not specifically listed.

Turning now to FIG. 3, a flow chart illustrating an example method 300 for diagnosing a degraded VDE system for an engine (e.g., engine 10 shown in FIG. 1) is shown. Therein, degradation of VDE mechanisms may be diagnosed when the engine is transitioned between operating in a VDE mode with at least one cylinder deactivated to a non-VDE with all cylinders active, and the resulting changes in fuel economy are observed.

Instructions for carrying out method 300 and other methods described herein may be executed by a controller based on instructions stored on a memory of the controller and in conjunction with the variable displacement engine mechanisms as described above with reference to FIGS. 1-2. The controller may employ engine actuators (e.g., intake valve and exhaust valve actuators) of the engine system to adjust VDE operation, according to the methods described below.

At 302, the method includes determining engine operating conditions. Operating conditions may include engine speed, engine load, vehicle speed, pedal position, throttle position, mass air flow rate, air-fuel ratio, engine temperature, the amount of compressed air in the intake from the turbocharger, oil temperature, etc.

At 304, the method includes determining whether VDE system diagnostic conditions have been met. The VDE system diagnostic conditions may include steady-state operation at a light engine load. In one example, the VDE system diagnostic conditions may include highway cruising, where the vehicle speed is high and stable and the engine load is low and steady. For example, vehicle highway cruising may include the vehicle operating at a speed of 60 MPH with the vehicle speed and engine load changing by less than a threshold (such as 5% or 10%) over a given duration, such as a ten or twenty second time period. Additional VDE system diagnostic conditions at 304 may include determining whether a threshold duration has elapsed since completion of the previous VDE system diagnostic routine. For example, the VDE diagnostic routine may be initiated after a duration measured by a threshold number of fuel tank fill-ups, a threshold number of vehicle miles traveled, or other sensor input. If the VDE system diagnostic conditions are not met (the vehicle speed is not high or engine load is high or other such combinations) (e.g., NO at 304), method 300 returns to 302 to continue to determine operating conditions.

However, if the VDE system diagnostic conditions are met (e.g., YES at 304), method 300 proceeds to 306 to enter or maintain a VDE mode. In the VDE mode, a selected number of cylinders are deactivated. As described previously, one or more engine cylinders may be selected for deactivation. This may include selectively deactivating one or more cylinders on a first bank, one or more cylinders on a second bank, or one or more cylinders on each of the first and second banks. The number and identity of cylinders deactivated on each bank may be symmetrical or asymmetrical. While the selected cylinders are disabled, the remaining enabled or active cylinders continue to carry out combustion with cylinder valve mechanisms active and operating. The maximum number of deactivatable cylinders may be selected for deactivation. For example, if the engine is configured to deactivate up to six cylinders, all six deactivatable cylinders may be deactivated. In other examples, other numbers of deactivable cylinders may be deactivated.

Cylinder valves may be deactivated by closing an intake valve coupled to a cylinder during the intake stroke for that cylinder, and an exhaust valve coupled to a cylinder being closed during the exhaust stroke for that cylinder. Thus, at least in one example, the cylinders may be deactivated by deactivating cylinder valves. Deactivating cylinder valves may include holding cylinder valves (e.g., the intake and exhaust valves of the deactivated cylinders) in a closed state (e.g., where the intake ports and exhaust ports of the deactivated cylinders are maintained closed/blocked) over two consecutive engine revolutions. Further, the fuel injectors (e.g., fuel injector 66 of FIGS. 1-2) coupled to each of the cylinders may be selectively controlled not to deliver fuel to the cylinders to be deactivated. The ignition system (e.g., ignition system 190 of FIG. 2) may also be selectively controlled not to deliver spark via the spark plugs coupled to each cylinder to be deactivated.

Upon VDE activation and after the selected number of cylinders have been deactivated, method 300 may measure a first fuel economy FE 1 at 308. Fuel economy (FE) calculations may be based on fuel usage, for example. Fuel economy of the vehicle may also take into account distance traveled by the vehicle (e.g., miles). Thus, the first fuel economy of the vehicle may be calculated based on measured fuel consumption relative to a measured distance traveled. In one example, the fuel economy may be determined based on output from one or more engine sensors, including but not limited to the exhaust oxygen sensor (e.g., sensor 128 of FIG. 2), mass air flow sensor (e.g., sensor 122 of FIG. 2), vehicle odometer, and/or engine speed sensor, as well as fuel usage amounts (which may be determined based on fuel injector pulse width/duty cycle, for example).

In one example, the controller may calculate the first fuel economy after VDE activation (e.g., after entering the VDE mode) after a pre-determined time has elapsed (e.g., two minutes, five minutes, etc.) or after a pre-determined elapsed mileage (e.g., five miles, ten miles, etc.), while the vehicle continues to operate at steady-state. In another example, the fuel economy may be calculated intermittently over a specified time period (e.g., once per minute over a five minute time period), and an average fuel economy may be calculated. The FE 1 thus calculated may be stored in the memory of the controller and may be used to diagnose possible degradation of the VDE, as explained below.

At 310, method 300 includes exiting VDE operation (e.g., entering non-VDE mode). The VDE system may be deactivated after the first fuel economy (FE 1) has been measured and stored in the memory of the controller. As described previously, deactivation of the VDE results in the transition from the selected cylinders being deactivated to all engine cylinders being active (e.g., actively combusting). Activation of the deactivated cylinders may comprise actuating a solenoid to adjust a camshaft position, thereby actuating the cylinder valves.

At 312, method 300 includes measuring a second fuel economy FE 2. The second fuel economy may be measured by calculating fuel consumption relative to distance traveled, following the command to exit the VDE mode and enter the non-VDE mode. The controller may calculate the fuel economy at a pre-determined time or mileage or alternatively measure fuel economy intermittently over a specified time period, and calculate an average FE 2 for the vehicle operating in the non-VDE (all engine cylinders firing). As explained previously, operation in the VDE mode may consume less fuel (and thus operate at a higher fuel efficiency) as compared to operation in the non-VDE mode (which operates with a lower fuel efficiency), and thus switching from the VDE mode to the non-VDE mode while engine operating conditions (such as engine speed and engine load) remain steady may result in an expected change (e.g., a decrease) in the measured fuel economy of the vehicle.

At 314, method 300 includes calculating a difference in the fuel economy before and after VDE deactivation. For example, a difference between the first fuel economy and the second fuel economy (FE 1-FE 2) may be calculated.

At 316, method 300 includes determining if the difference in the fuel economy before and after VDE deactivation (FE 1-FE 2) is greater than a threshold difference. The threshold difference may be a non-zero positive value threshold difference, representing a difference in fuel economy below which the degradation of the VDE system may be indicated. In one example, the threshold difference may be three miles per gallon (MPG). In another example, the threshold difference may be a relative difference such as a change in fuel economy of 5% or 10%. A vehicle operating in the VDE mode with select cylinders deactivated may use less fuel for consumption, thereby improving fuel economy at high speeds, measured as the first fuel economy FE 1. In contrast, when commanded by the controller to operate in the non-VDE mode, relatively more fuel may be consumed by all of the cylinders combined, leading to a decrease in the fuel economy of the vehicle, measured as the second fuel economy FE 2. In the example of a functioning VDE system (e.g., VDE not degraded), the difference in the fuel economy before and after VDE deactivation (FE 1-FE 2) will be greater than the threshold difference. Thus, if method 300 determines the change in the fuel economy (FE 1-FE 2) is greater than the threshold difference at 316, then the method proceeds to 318 and indicates the VDE system is not degraded. If the VDE system is not degraded, the engine may operate with selected cylinders deactivated whenever operating conditions permit. Method 300 then returns.

However, if at 316 method 300 determines that the change in fuel economy (FE 1-FE 2) is not greater than the threshold difference, the VDE system (e.g., the VDE mechanisms that hold the exhaust valves closed, or the exhaust valve sealing mechanisms) may be degraded. To differentiate between VDE mechanism degradation where the VDE mechanisms are stuck in the VDE mode (e.g., where the exhaust valves are held closed), even during non-VDE operation, and VDE mechanism degradation where the VDE mechanisms are stuck in the non-VDE mode (e.g., where the exhaust valves are actuated), even during VDE operation, the measured fuel economy may be compared to a baseline fuel economy.

Accordingly, the method proceeds to 320 to further determine if FE 1 is within a threshold range of a baseline FE. The baseline FE may represent the fuel economy of the vehicle during standard fuel economy measurement conditions, such as when the vehicle is traveling at a steady speed (e.g., 60 MPH) on level ground (e.g., such that engine load is low and not changing). The baseline FE value may be determined by the controller and further stored in the memory of the vehicle controller. The baseline FE may be determined prior to the VDE system transition (e.g., from active to deactivated) while the vehicle is operating with the first vehicle operating conditions. In some examples, the baseline FE may be determined at the time of vehicle manufacture. Additionally or alternatively, the baseline FE may be determined and/or updated over the lifetime of the vehicle to account for changes in fuel economy as vehicle components wear. In either example, the baseline FE may be determined when the VDE system is not degraded and may be determined during active VDE operation. The threshold range of the baseline FE may be 3%-5% of the baseline fuel economy and may be stored in the memory of the controller.

If the first fuel economy FE 1 is determined to be within the threshold range of the baseline fuel economy (e.g., YES at 320), method 300 at 322 indicates the engine is stuck in the VDE mode. The engine may be indicated as stuck in the VDE mode based on the first fuel economy FE 1 being within a threshold range of the baseline fuel economy (e.g., within a 3%-5% range of the baseline FE measured) and further based on the difference between the first fuel economy and the second fuel economy (FE 1-FE 2) being less than the threshold difference.

The first fuel economy being within the threshold range of the baseline fuel economy indicates that the VDE is operating actively (e.g., the selected cylinders have been deactivated). Upon the commanded change in VDE operation to the non-VDE mode, the second fuel economy measured would be expected to change if the VDE system were not degraded. If the first fuel economy (measured with select cylinders deactivated) and the second fuel economy (measured with all cylinders firing) are similar, e.g., the difference between the first fuel economy and the second fuel economy (FE 1-FE 2) is less than the threshold difference, then the VDE mechanisms are determined to be stuck (e.g., degraded). Because the first fuel economy FE 1 is determined to be within the threshold range of the baseline fuel economy, the VDE system is confirmed as being stuck in the VDE mode with the intake and/or exhaust valves of the selected cylinders continuing to be held closed, even during commanded operation in the non-VDE mode.

At 324, method 300 includes notifying an operator of the vehicle of the degraded VDE system and/or setting a diagnostic code indicative of the degraded VDE function. An indication of degradation may include an indication of degradation of a cylinder deactivation mechanism coupled to a cylinder valve. For example, an operator may be notified by illuminating an indicator on the vehicle instrument panel alerting the vehicle operator of the received notification. In still further examples, because the selected cylinders are determined to be stuck in the VDE mode, the selected cylinders may be commanded to be deactivated during all subsequent operating periods until the VDE mechanisms are determined to be not degraded (e.g., after a service event). The remaining active cylinders may receive additional fuel and operating under an increased load, for example, to meet operator-requested torque. Method 300 then returns.

Returning to 320, if the first fuel economy FE 1 is not determined to be within a threshold range of the baseline fuel economy (e.g., NO at 320), method 300 proceeds to 326 to indicate the VDE is stuck in the non-VDE mode (e.g., where the intake and/or exhaust valves of the selected cylinders are actuated even when the engine is commanded to operate in the VDE mode). The VDE mechanisms may be indicated as stuck in the non-VDE mode (e.g., degraded) based on the first fuel economy FE 1 not being within a threshold range of the baseline fuel economy and further based on the difference between the first fuel economy and the second fuel economy (FE 1-FE 2) being less than the threshold difference.

For example, the first fuel economy being outside the threshold range of the baseline fuel economy (not within 3%-5% as an example) at vehicle high speed and steady-state conditions indicates the VDE mechanisms are actuating the intake and/or exhaust valves and hence reducing fuel economy relative to non-degraded VDE mechanisms. Further, upon the commanded change the VDE mode to the non-VDE mode, the second fuel economy measured would be anticipated to change if the VDE system were functional. If the first fuel economy and the second fuel economy are determined to be similar, e.g., the difference between the first fuel economy and the second fuel economy (FE 1-FE 2) is less than the threshold difference, then the VDE is determined as stuck (e.g. degraded). Because the first fuel economy FE 1 is not within a threshold range of the baseline fuel economy, the VDE system is confirmed as being stuck in the non-VDE mode with the intake and/or exhaust valves of the selected cylinders continuing to actuate, even when the engine is commanded to operate with the selected cylinders deactivated.

Upon diagnosing the VDE as being stuck in the non-VDE mode, method 300 may proceed to 324 to notify an operator of the vehicle of the VDE system being degraded and/or set a diagnostic code indicative of the VDE function being degraded. An indication of degradation may indicate degradation of a cylinder deactivation mechanism coupled to a cylinder valve. For example, an operator may be notified by illuminating an indicator on the vehicle instrument panel alerting the vehicle operator of the received notification. In some examples, upon determining that the selected cylinders are unable to be fully deactivated, the controller may disable future VDE operation until the VDE mechanisms are determined not be degraded (e.g., after a service event). Method 300 then returns.

In this way, a commanded change in VDE operation may result in a measurable change in the fuel usage by the vehicle, impacting fuel economy. Based on a comparison of the second fuel economy measured after VDE deactivation to baseline fuel economy and/or a first fuel economy measured while VDE is active, a diagnosis of degradation of the VDE function may be indicated. While FIG. 3 is shown as initiating the diagnostic routine while in the VDE mode, exiting out of the VDE mode, and comparing the resultant change in fuel economy to a threshold change, the operations may be carried out in a different order without departing from the scope of the disclosure. For example, the routine may commence when the engine is operating with all cylinders active (e.g., the non-VDE mode), deactivate one or more deactivatable cylinders (e.g., enter the VDE mode), and then compare the resultant change in fuel economy to a threshold change. In such an example, the fuel economy may be expected to increase upon operation in the VDE mode.

VDE degradation may be indicated responsive to a difference between the first fuel economy and the second fuel economy being less than a first threshold difference and the first fuel economy being within a second threshold range of the baseline fuel economy. In this way, VDE mechanisms may be indicated as stuck in the VDE mode, with the selected cylinders stuck in the deactivated state.

VDE degradation may also be indicated responsive to a difference between the first fuel economy and the second fuel economy being less than a first threshold difference and the first fuel economy being outside of a second threshold range of the baseline fuel economy. In this way, VDE mechanisms may be indicated as stuck in the non-VDE mode, with all cylinder valves active.

In some examples, rather than measuring fuel economy before and after the commanded change in VDE mode in order to determine if the VDE actuators are degraded, method 300 may additionally or alternatively utilize other mechanisms for measuring fuel usage, such as an absolute volume of fuel consumed, a duty cycle of the fuel injectors of the engine, or other fuel usage metric.

FIG. 4 shows a timing diagram 400 of operating parameters that may be observed during the execution of method 300. The first plot from the top of diagram 400 illustrates fuel economy as a function of time (shown by curves 402 and 404). Fuel economy increases from a relatively low fuel economy (e.g., 30 MPG) to a relatively high fuel economy (e.g., 35 MPG) along the vertical axis (y-axis). The second plot from the top illustrates vehicle speed as a function of time (shown by curve 406). Vehicle speed increases from a speed of zero to a relatively high speed (e.g., 60 MPH) along the vertical axis. The third plot from the top illustrates VDE mode as a function of time, shown by curve 408, where the VDE mode is either an active VDE mode or a deactivated non-VDE mode. The fourth plot from the top illustrates engine load as a function of time (shown by curve 412). Engine load increases from a load of zero to a maximum rated load along the vertical axis. Each of the illustrated plots are time aligned.

At time t1, the vehicle speed is relatively high, such as at 60 MPH, and the engine load is relatively low (e.g., less than 25% of maximum rated load). Due to the low load, the engine is operating in the VDE mode with at least one cylinder deactivated. As a result, fuel economy is relatively high (as shown by both curves 402 and 404, which overlap between times t1 and t2). Between time t1 and time t2, fuel economy may be measured and stored in the controller (e.g., as an average fuel economy, FE 1).

At time t2, the engine is switched to the non-VDE mode and all cylinders are active. As such, all of the VDE mechanisms for the deactivated cylinders are commanded to be active (e.g., the intake and exhaust valves are commanded to actuate). Following reactivation of the all the cylinders, fuel economy is again measured (e.g., during time t2 to t3) and stored in the controller (e.g., as an average fuel economy FE 2). The FE 2 is compared to FE 1 to determine if the VDE mechanisms are degraded. As explained previously, fuel economy is expected to decrease upon the commanded switch to the non-VDE mode, as the decreased manifold pressure, inaccurate fuel metering, and/or other issues associated with operating with all cylinders during low loads negatively affects fuel economy. Thus, as shown by curve 404, the fuel economy drops to a relatively low fuel economy if the VDE actuators (e.g., the cylinder deactivation mechanisms) are not degraded. However, if the VDE actuators are degraded, the fuel economy does not change upon switching from the VDE mode to the non-VDE mode, as shown by curve 402.

Furthermore, the baseline fuel economy is shown as line 403. As appreciated by FIG. 4, the fuel economy from time t1 to time t2 (FE 1) is substantially similar to the baseline fuel economy (e.g., within a threshold of the baseline, such as within 3-5% of the baseline). The fuel economy from time t2 to time t3 (FE 2) is also substantially similar to the baseline (for the vehicle exhibiting degraded VDE mechanisms). As such, the VDE mechanisms are determined to be stuck in the active, VDE mode, as the VDE mechanisms are able to operate as intended during VDE mode (e.g., the intake and exhaust valves are held closed during VDE mode) but are not able to be actuated during the non-VDE mode. At time t3, the diagnostic routine ends and the engine again operates in the VDE mode, causing the fuel economy to increase (if the VDE mechanisms are not degraded).

FIG. 5 shows another timing diagram 500 of operating parameters that may be observed during the execution of method 300. The first plot from the top of diagram 500 illustrates fuel economy as a function of time (shown by curves 502 and 504). Fuel economy increases from a relatively low fuel economy (e.g., 30 MPG) to a relatively high fuel economy (e.g., 35 MPG) along the vertical axis (y-axis). The second plot from the top illustrates vehicle speed as a function of time (shown by curve 506). Vehicle speed increases from a speed of zero to a relatively high speed (e.g., 60 MPH) along the vertical axis. The third plot from the top illustrates cylinder status as a function of time, shown by curve 508, where the cylinder status is either VDE mode or non-VDE mode. The fourth plot from the top illustrates engine load as a function of time (shown by curve 512). Engine load increases from a load of zero to a maximum rated load along the vertical axis. Each of the illustrated plots are time aligned.

At time t1, the vehicle speed is relatively high, such as at 60 MPH, and the engine load is relatively low (e.g., less than 25% of maximum rated load). Due to the low load, the engine is operating in the VDE mode with at least one cylinder deactivated. As a result, for an engine operating with non-degraded VDE mechanisms (shown by curve 502), fuel economy is relatively high between times t1 and t2. Between time t1 and time t2, fuel economy may be measured and stored in the controller (e.g., as an average fuel economy, FE 1). In contrast, for an engine operating degraded VDE mechanisms (shown by curve 504), the fuel economy may be relatively low, as the VDE mechanisms are not operating as intended and the engine is unable to seal the selected deactivatable cylinders, resulting in a fuel economy penalty.

At time t2, the engine is switched to the non-VDE mode and all cylinders are active. As such, all of the VDE mechanisms for the deactivated cylinders are commanded to be active (e.g., the intake and exhaust valves are commanded to actuate). Following reactivation of the all the cylinders, fuel economy is again measured (e.g., during time t2 to t3) and stored in the controller (e.g., as an average fuel economy FE 2). The FE 2 is compared to FE 1 to determine if the VDE mechanisms are degraded. As explained previously, fuel economy is expected to decrease upon the commanded switch to the non-VDE mode, as the decreased manifold pressure, inaccurate fuel metering, and/or other issues associated with operating with all cylinders during low loads negatively affects fuel economy. Thus, as shown by curve 502, the fuel economy drops to a relatively low fuel economy if the VDE actuators (e.g., the cylinder deactivation mechanisms) are not degraded. However, if the VDE actuators are degraded, the fuel economy does not change upon switching from the VDE mode to the non-VDE mode, as shown by curve 504.

Furthermore, the baseline fuel economy is shown as line 503. As appreciated by FIG. 5, the fuel economy from time t1 to time t2 (FE 1) is different than the baseline fuel economy (e.g., outside of a threshold of the baseline, such as outside of 3-5% of the baseline). The fuel economy from time t2 to time t3 (FE 2) is also different than the baseline (for the vehicle exhibiting degraded VDE mechanisms). As such, the VDE mechanisms are determined to be stuck in the non-VDE mode, as the VDE mechanisms are unable to operate as intended during VDE mode (e.g., the intake and/or exhaust valves are actuated or not sealed during VDE mode) but are able to be actuated during the non-VDE mode. At time t3, the diagnostic routine ends and the engine again operates in the VDE mode, causing the fuel economy to increase (if the VDE mechanisms are not degraded).

In some examples, when transitioning from operating in the non-VDE mode to operating in the VDE mode, an engine may deactivate selected cylinders simultaneously. In such a configuration, if only a subset of the deactivatable cylinders include degraded VDE mechanisms (for example, if only one deactivatable cylinder has a leaky exhaust valve), the diagnostic routine described above may not be able to identify which cylinder(s) includes degraded VDE mechanisms. However, in engine configurations where each deactivatable cylinder is deactivated in succession (referred to as rolling VDE) or otherwise is able to selectively deactivate each deactivatable cylinder, the cylinder(s) including degraded VDE mechanisms may be identified by measuring a rate of change of fuel economy as the selected cylinders are deactivated in succession. In other examples, explained in more detail below, the exhaust flow or pressure may be monitored during cylinder deactivation in order to identify which cylinder(s) includes degraded VDE mechanisms.

FIG. 6 is a flow chart illustrating a method 600 for identifying a degraded cylinder VDE mechanism. Method 600 may be performed in response to detecting VDE mechanism degradation, for example upon determining the VDE mechanisms are stuck in the VDE mode (at 322 of FIG. 3) or the non-VDE mode (at 326 of FIG. 3). In other examples, method 600 may be performed independent of method 300 of FIG. 3 as an alternative or additional VDE diagnostic routine.

Instructions for carrying out method 600 may be executed by a controller based on instructions stored on a memory of the controller and in conjunction with the variable displacement engine mechanisms as described above with reference to FIGS. 1-2. The controller may employ engine actuators (e.g., intake valve and exhaust valve actuators) of the engine system to adjust VDE operation, according to the methods described below.

At 602, the method includes determining engine operating conditions. Operating conditions may include engine speed, engine load, vehicle speed, pedal position, throttle position, mass air flow rate, air-fuel ratio, engine temperature, the amount of compressed air in the intake from the turbocharger, oil temperature, etc.

At 604, the method includes determining whether VDE system diagnostic conditions have been met. The VDE system diagnostic conditions may include steady-state operation at a light engine load. In one example, the VDE system diagnostic conditions may include highway cruising, where the vehicle speed is high and stable and the engine load is low and steady. For example, vehicle highway cruising may include the vehicle operating at a speed of 60 MPH with the vehicle speed and engine load changing by less than a threshold (such as 5% or 10%) over a given duration, such as a ten or twenty second time period. Additional VDE system diagnostic conditions at 604 may include determining whether a threshold duration has elapsed since completion of the previous VDE system diagnostic routine. For example, the VDE diagnostic routine may be initiated after a duration measured by a threshold number of fuel tank fill-ups, a threshold number of vehicle miles traveled, or other sensor input. If the VDE system diagnostic conditions are not met (the vehicle speed is not high or engine load is high or other such combinations) (e.g., NO at 604), method 600 returns to 602 to continue to determine operating conditions. In some examples, the VDE system diagnostic conditions may include the engine currently operating with all cylinders active, e.g., before the onset of operation in the VDE mode.

If the VDE system diagnostic conditions are met (e.g., YES at 604), method 600 proceeds to 606 to activate rolling VDE, in order to deactivate selected cylinders one at a time. In this way, a first selected cylinder may be deactivated while all other cylinders remain active. Then, once the first selected cylinder is deactivated, a second selected cylinder may be deactivated, the first selected cylinder may remain deactivated, and the remaining cylinders may be active. The process may repeat until all selected cylinders are deactivated.

At 608, method 600 includes measuring an exhaust parameter with a dP sensor at each cylinder deactivation. The dP sensor may be a differential pressure sensor coupled across a particulate filter in the exhaust system, for example. In another example, the dP sensor may be a DPFE sensor (e.g., sensor 126 in the EGR system). In one example, the exhaust parameter may be exhaust pressure. In another example, the exhaust parameter may be exhaust flow.

At 610, method 600 includes determining if an expected dP response is observed, e.g., if the output from the dP sensor during the rolling cylinder deactivation is an expected output. In an example, the output from the dP sensor may be expected to decrease in a stair-step manner as each selected cylinder is deactivated, if the VDE mechanisms are not degraded. In other examples, the output from the dP sensor may decrease at an expected rate of change over the duration that each selected cylinder is deactivated, if the VDE mechanisms are not degraded.

If the expected dP response is observed, method 600 proceeds to 612 to indicate that the VDE mechanisms are functional. If the expected dP response is not observed, method 600 proceeds to 614 to indicate degraded VDE mechanisms. At 616, method 600 notifies an operator and/or sets a diagnostic code indicative of the degraded VDE mechanisms. At 618, method 600 optionally includes identifying which cylinder(s) include the degraded VDE mechanisms (e.g., which cylinders have a leaky or otherwise unsealed exhaust valve). As explained above, the exhaust pressure or exhaust flow may be expected to decrease in a stair-step manner, with each drop in exhaust flow/pressure corresponding to a cylinder deactivation event. However, if a cylinder is exhibiting a leaky or unsealed exhaust port (due to a degraded VDE mechanism for that cylinder), the exhaust pressure/flow may not decrease when that cylinder is commanded to deactivate. Thus, rather than observing four steps in the decrease of exhaust pressure/flow over the course of the rolling cylinder deactivation, only three or two steps may be observed. The controller may then identify which step is missing and identify the cylinder that was commanded to deactivate at that time. If the cylinder(s) with the degraded VDE mechanisms is identified, that cylinder may remain activated during VDE mode, for example.

FIG. 7 shows a timing diagram 700 of operating parameters that may be observed during the execution of method 600. The first plot from the top of diagram 700 illustrates vehicle speed as a function of time (shown by curve 702). Vehicle speed increases from a speed of zero to a relatively high speed (e.g., 60 MPH) along the vertical axis. The second plot from the top illustrates cylinder status as a function of time, shown by curve 704, where the cylinder status includes all cylinders activated through a fully deactivated state where all deactivatable cylinders are deactivated. In between fully activated and fully deactivated, the cylinders status illustrates each selected cylinder being sequentially deactivated. The third plot from the top illustrates engine load as a function of time (shown by curve 706). Engine load increases from a load of zero to a maximum rated load along the vertical axis. The fourth plot from the top illustrates dP sensor output (shown by curves 708, 710, and 712), with values of the output increasing along the vertical axis. Each of the illustrated plots are time aligned.

At time t1, the vehicle speed is relatively high, such as at 60 MPH, and the engine load is relatively low (e.g., less than 25% of maximum rated load). The engine is operating with all cylinders activated, and the output of the dP sensor is steady and in a mid range between relatively low and relatively high. Due to the low load and steady operating conditions, the VDE diagnostic routine is initiated at time t2. Between t2 and t3, each of four deactivatable cylinders is deactivated in series (a first cylinder is deactivated at time t2, followed by a second cylinder shortly thereafter, then a third cylinder, and finally a fourth cylinder). By time t3, all four deactivatable cylinders have been deactivated (or commanded to be deactivated).

As shown by curve 708, the dP sensor output decreases each time a cylinder is deactivated, if each deactivatable cylinder includes non-degraded VDE mechanisms. After each deactivation event, the dP sensor output may begin to recover as the remaining active cylinders increase in load to maintain requested torque; however, the overall trend in the dP sensor output over the duration of the rolling cylinder deactivation includes a decrease in the dP sensor output (e.g., corresponding to temporary decreases in exhaust flow as each exhaust valve of the selected cylinders is held successively closed during the rolling cylinder deactivation). Once all selected cylinders are deactivated, the dP sensor output may increase back to the output observed at the start of the rolling cylinder deactivation.

In contrast, the dP sensor output may include a different dP sensor response if the VDE mechanisms are degraded. In a first example, shown by curve 710, the dP sensor output may decrease similar to the non-degraded VDE mechanism engine dP sensor output when the first selected cylinder is deactivated. However, when the second selected cylinder is commanded to deactivate, the exhaust valve of the second selected cylinder may not be held closed and may instead actuate or otherwise not seal the exhaust port of the second selected cylinder. As a result, the dP sensor output may not decrease when the second selected cylinder is deactivated. This lack of decrease in the dP sensor output may be identified and matched to the cylinder that was commanded to deactivate at that time to identify the degraded/leaky cylinder.

In another example, shown by curve 712, the VDE mechanisms of all the deactivatable cylinders may be degraded, such that none of the exhaust valves of the deactivatable cylinders are held closed when commanded to deactivate. Thus, during the course of the rolling deactivation, the dP output may remain relatively steady. At time t3, the diagnostic routine may end and the cylinders may remain in the fully deactivated state.

In this way, output from the dP sensor may be used to identify, confirm, and/or diagnose degraded VDE mechanisms. Such an approach may be used in conjunction with the fuel economy diagnostic routine described above to ensure a more robust identification of degraded VDE mechanisms.

The technical effect of diagnosing VDE mechanisms based on a change in fuel economy is a low-cost, robust method for detecting if VDE mechanisms are operating as intended.

In another representation, a method for an engine includes indicating degradation of a variable engine displacement mechanism during vehicle steady-state operation based on a fuel usage change of the engine, upon a commanded change in engine displacement. The fuel usage change may include a change in average fuel economy. In an example, the commanded change in engine displacement may include a commanded increase in engine displacement, and the fuel usage change may include an increase in fuel usage following the increase in engine displacement. In another example, the commanded change in engine displacement may include a commanded decrease in engine displacement, and the fuel usage change may include a decrease in fuel usage following the decrease in engine displacement.

In one example, a method may include during steady-state vehicle cruising, operating an engine with one or more cylinders of the engine deactivated; commanding the one or more cylinders to reactivate; and indicating cylinder valve actuator degradation responsive to a fuel usage change following the command to reactivate. In an example, the method may include determining that a vehicle in which the engine is installed is operating with steadystate vehicle cruising (e.g., with load less than a threshold load and the load changing by less than a threshold amount and/or with vehicle speed above a threshold and vehicle speed changing by less than a threshold amount), and in response thereto commanding the one or more previously deactivated cylinders to reactivate; and determining a fuel usage change upon commanding the reactivation (which may be determined during the steady-state vehicle cruising, but with all cylinders active), and in response thereto indicating cylinder valve actuator degradation. Further, instructions stored in memory may include determining that the vehicle is operating with steady-state vehicle cruising (e.g., based on sensor output, such as a MAP or MAF sensor and/or vehicle speed sensor), and in response thereto commanding the one or more previously deactivated cylinders to reactivate. The instructions may include instructions to send a signal to the cylinder valve actuator to reactivate the deactivated cylinder by commencing actuation of cylinder valves. The instructions may include determining a fuel usage change upon commanding the reactivation (which may be determined during the steady-state vehicle cruising, but with all cylinders active and may be determined based on sensor output and/or controller commands, such as based on fuel injection amounts, vehicle speed, and exhaust sensor output), and in response thereto indicating cylinder valve actuator degradation. The instructions may include instructions to send a notification of the cylinder valve actuator degradation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
during steady-state vehicle cruising with vehicle speed at least at a threshold speed,
operating an engine with one or more cylinders of the engine deactivated;
commanding the one or more cylinders to reactivate; and
indicating cylinder valve actuator degradation responsive to a fuel usage change following the command to reactivate, wherein the fuel usage change is a change in a level of average fuel economy determined from measured fuel consumption relative to a measured distance traveled.

2. The method of claim 1, wherein operating the engine with one or more cylinders of the engine deactivated comprises operating the engine with respective intake and exhaust valves of the one or more cylinders held closed over at least an engine cycle.

3. The method of claim 2, wherein commanding the one or more cylinders to reactivate comprises commanding the respective intake and exhaust valves of the one or more cylinders to actuate.

4. The method of claim 1, further comprising determining a first fuel economy while operating the engine with the one or more cylinders deactivated and determining a second fuel economy while operating the engine with the one or more cylinders activated.

5. The method of claim 4, wherein indicating cylinder valve actuator degradation based on the change in fuel economy comprises indicating one or more cylinder valves is stuck in a deactivated state based on a difference between the first fuel economy and the second fuel economy being less than a first threshold difference and the first fuel economy being within a second threshold range of a baseline fuel economy.

6. The method of claim 5, further comprising, based on indicating that the one or more cylinder valves is stuck in the deactivated state, commanding the cylinders to which the one or more cylinder valves are coupled to remain deactivated and increasing a load on remaining cylinders.

7. The method of claim 4, wherein indicating cylinder valve degradation based on the change in fuel economy comprises indicating that one or more cylinder valves is stuck in an activated state based on a difference between the first fuel economy and the second fuel economy being less than a first threshold difference and the first fuel economy being outside of a second threshold range of a baseline fuel economy.

8. The method of claim 1, further comprising based on the indication of cylinder valve degradation, notifying an operator and/or setting a diagnostic code.

9. A system for a vehicle including an engine with a deactivatable cylinder and a non-deactivatable cylinder, comprising:
an intake valve and an exhaust valve each coupled to the deactivatable cylinder, the intake valve and the exhaust valve each selectively actuatable via a variable displacement engine (VDE) actuation system; and
a controller storing instructions in non-transitory memory executable to command the VDE actuation system to switch from a VDE mode where the intake valve and the exhaust valve are not actuated to a non-VDE mode where the intake valve and the exhaust valve are actuated, and indicate degradation of the VDE actuation system responsive to a change in average fuel economy following the command being less than a threshold change, wherein the instructions are executable to indicate that the degradation of VDE actuation system includes the VDE actuation system being stuck in the VDE mode based on the average fuel economy following the command being substantially equal to a baseline fuel economy.

10. The system of claim 9, wherein the instructions are executable to indicate the degradation of the VDE actuation system includes the VDE actuation system being stuck in the non-VDE mode based on the average fuel economy following the command being less than the baseline fuel economy.

11. The system of claim 10, wherein the instructions are executable to command the VDE actuation system to switch from the VDE mode to the non-VDE mode during steady-state vehicle cruising conditions, and wherein the controller is configured to, during a prior engine operation, operate the vehicle with the steady-state vehicle cruising conditions and with the VDE actuation system in the VDE mode and determine the baseline fuel economy based on fuel usage over time.

12. The system of claim 9, wherein the instructions are executable to notify an operator and/or set a diagnostic code responsive to the indication of degradation of the VDE actuation system.

13. An engine method, comprising:
during steady-state vehicle cruising,
determining fuel economy of an engine with one or more deactivated cylinders, the one or more deactivated cylinders including deactivated cylinder valves;
reactivating the one or more cylinders by activating the deactivated cylinder valves; and
indicating valve actuator degradation responsive to a less than threshold decrease in fuel economy from the determined fuel economy following the reactivating.

14. The method of claim 13, wherein activating the deactivated cylinder valves comprises actuating a solenoid to adjust a camshaft position to actuate the cylinder valves.

15. The method of claim 13, wherein indicating valve actuator degradation comprises setting a diagnostic code and notifying an operator.

16. The method of claim 13, further comprising disabling deactivation of the cylinder valves in response to the indication of cylinder valve degradation.

17. The method of claim 13, further comprising disabling reactivation of the deactivated cylinder valves in response to the indication of cylinder valve degradation.

18. The method of claim 13, wherein deactivating cylinder valves includes holding cylinder valves in a closed state over two consecutive engine revolutions.

* * * * *